United States Patent
Mattela et al.

(10) Patent No.: US 10,356,092 B2
(45) Date of Patent: Jul. 16, 2019

(54) UNCLONEABLE REGISTRATION OF AN INTERNET OF THINGS (IOT) DEVICE IN A NETWORK

(71) Applicant: Redpine Signals, Inc., San Jose, CA (US)

(72) Inventors: Venkat Mattela, San Jose, CA (US); Duen Jeng Wang, Cupertino, CA (US)

(73) Assignee: Redpine Signals, Inc., San Jose, CA (US)

( * ) Notice: Subject to any disclaimer, the term of this patent is extended or adjusted under 35 U.S.C. 154(b) by 132 days.

(21) Appl. No.: 15/684,854

(22) Filed: Aug. 23, 2017

(65) Prior Publication Data

US 2019/0068592 A1 Feb. 28, 2019

(51) Int. Cl.
*H04L 29/06* (2006.01)
*H04W 12/06* (2009.01)

(52) U.S. Cl.
CPC ...... *H04L 63/0876* (2013.01); *H04L 63/0428* (2013.01); *H04L 63/083* (2013.01); *H04W 12/06* (2013.01)

(58) Field of Classification Search
CPC .................................................. H04L 63/0876
See application file for complete search history.

(56) References Cited

U.S. PATENT DOCUMENTS

2015/0222621 A1* 8/2015 Baum ...................... H04W 4/70
726/9

2015/0229654 A1* 8/2015 Perier ................... H04W 12/06
726/3
2016/0072808 A1 3/2016 David et al.
(Continued)

FOREIGN PATENT DOCUMENTS

EP 3062541 A1 8/2016
WO 2017106224 A1 6/2017

OTHER PUBLICATIONS

Saied et al.; HIP Tiny Exchange (TEX): A distributed key exchange scheme for HIP-based Internet of Things; Published in: Third International Conference on Communications and Networking; Date of Conference: Mar. 29-Apr. 1, 2012; IEEE Xplore (Year: 2012).*

(Continued)

*Primary Examiner* — Bradley W Holder
(74) *Attorney, Agent, or Firm* — File-EE-Patents.com; Jay A. Chesavage

(57) ABSTRACT

An IoT device has a public device identifier and a private device identifier, where the public device identifier is publicly available and the private device identifier is secret but kept in a secure device database as a correspondence. A registration request is sent from the IoT device to an association server in communication with the device database having an association between IoT public identifier and a corresponding IoT private identifier. The association server which receives the registration request responds with a registration acknowledgement containing, in encrypted form, the private device identifier of the original request and, optionally, the public device identifier associated with the registration request. The requesting IoT device receives the association acknowledgement, decrypts the private device identifier, compares it to its own device identifier, and if they match, sends one or more association requests.

13 Claims, 3 Drawing Sheets

(56) References Cited

U.S. PATENT DOCUMENTS

| | | | |
|---|---|---|---|
| 2016/0205078 A1* | 7/2016 | James | H04L 63/0442 |
| | | | 713/171 |
| 2016/0205097 A1* | 7/2016 | Yacoub | H04L 63/0876 |
| | | | 726/6 |
| 2016/0248746 A1* | 8/2016 | James | H04W 4/70 |
| 2017/0149614 A1 | 5/2017 | Zheng et al. | |
| 2017/0347223 A1* | 11/2017 | Robba | H04W 4/70 |
| 2017/0347224 A1* | 11/2017 | Robba | H04W 4/70 |
| 2017/0359343 A1* | 12/2017 | Sterl | H04L 63/0876 |
| 2018/0183587 A1* | 6/2018 | Won | G06F 21/44 |
| 2018/0288015 A1* | 10/2018 | Kudaraya | H04L 63/0442 |

OTHER PUBLICATIONS

Markmann et al.; Federated End-to-End Authentication for the Constrained Internet of Things Using IBC and ECC; Published in: SIGCOMM '15 Proceedings of the 2015 ACM Conference on Special Interest Group on Data Communication; pp. 603-604; ACM Digital Library (Year: 2015).*

Liu et al. "A security framework for the Internet of Things in the future Internet Architecture." In: Future Internet rom.

* cited by examiner

Sequence for IoT Physically Unclonable Registration & GW communication

UNCLONEABLE REGISTRATION OF AN INTERNET OF THINGS (IOT) DEVICE IN A NETWORK

FIELD OF THE INVENTION

The present invention relates to a method for registration of an Internet of Things (IoT) device. In particular, the invention relates to the secure and uncloneable registration of an IoT device to a wireless local area network (WLAN) using a remote association server which maintains secret private/public device data.

BACKGROUND OF THE INVENTION

A new type of station belonging to a class known as Internet of Things (IoT) devices are emerging for use in wireless computer networks. These IoT devices are typically small dedicated-use computers which have wireless network connectivity, with sensors or connectivity to other information processing systems, and which communicate information to a central or distributed series of host computers. Examples of IoT devices include home security camera and entry control systems, biomedical monitors for blood pressure or blood glucose, pacemakers with remotely accessible event logs, electrical distribution systems such as smart electric meters, and many other such dedicated purpose devices.

An IoT device for a wireless local area network (WLAN) typically has an ISO layer 2 address, such as a Media Access Controller (MAC), and an ISO layer 3 address, such as an Internet Protocol (IP) address, which is statically assigned or dynamically assigned such as by a Dynamic Host Configuration Protocol (DHCP) server. The MAC address is typically printed on the device or is otherwise publicly accessible.

An issue specific to IoT devices is the requirement for secure registration of the device to a particular network. In a prior art IoT registration sequence, the IoT device makes itself "discoverable", such as it may transmit association requests to a particular Service Set IDentifer (SSID) of an Access Point (AP) by sending WLAN association request packets, so that a wireless access point (AP) is able to identify the station by MAC address and associate with it into the infrastructure. However, in the case of an IoT device which contains proprietary information and is intended to be used in a secure manner, this type of open association compromises the security of the network and the security of the data the IoT devices accesses. One type of security risk is the use of the MAC address for registration into a network different from an original network, or registration of an alien device into a network. This type of security risk occurs because it is possible to "clone" a new station onto an existing WLAN by cloning (copying) the MAC address of an existing station as the MAC address of the new station, thereby authenticating the station for use in the WLAN by its trusted MAC address. It is desired to provide a protocol for the secure registration of an IoT device to prevent the use or re-registration of the device to other networks. It is also desired to provide an uncloneable registration of an IoT device into a wireless network.

OBJECTS OF THE INVENTION

A first object of the invention is a method for registration of an IoT device onto a network, where the IoT device has a public device identifier detectable externally and a device private identifier which is secret, where the association between IoT device public identifier and IoT private device identifier which are both maintained as a key:value pair in the device database of an association server which is remotely accessible, the registration method comprising the IoT sending a registration request accompanied by the public device identifier to the association server, the association server receiving the registration request accompanied by device public identifier, the association server responding with an encrypted registration acknowledgement containing the device public identifier and the device private identifier from the association server device database, the IoT device receiving the encrypted registration acknowledgement, decrypting the registration acknowledgement, extracting the private device identifier and comparing it with its own private device identifier to test for a match, and if the match is true, the IoT device sending an association request to enable the IoT device association with a wireless network.

A second object of the invention is an IoT device which has a public device identifier and a private device identifier, the IoT device sending a registration request containing the device public identifier, the IoT device, upon receipt of a registration acknowledgement containing an encrypted private device identifier, extracting the private device identifier, comparing the received private device identifier to the IoT private device identifier to determine a match, upon detection of a match, the IoT device sending an association request.

SUMMARY OF THE INVENTION

An IoT device with wireless networking capabilities (such as Bluetooth or 802.11) has a unique public device ID such as a MAC address, or an IP address, and also a unique private identifier which is not publicly accessible. The MAC address for WLAN is a 48 bit identifier which is unique to any other MAC address of any other device (unless having the capability to be cloned to a different MAC address), and the IP address is a 32 bit address which may or may not be unique or constant.

A remote association server maintains a device database where the unique public device ID and unique private identifier for each IoT device are stored as a key:value pair with the unique public device identifier as the key and private (secret) device ID as the value, or vice versa. The device database public and private device ID pairs match the IoT private and public addresses, and so is typically maintained by the manufacturer of the IoT device which has these capabilities. The remote association server optionally has a gateway database identifying a public device ID and gateway ID as a key:value pair, as well as an optional user database with a username and password for user authentication as well as optional additional fields for association of the username to particular public device identifiers, gateway IDs, or other information.

A registration step for the IoT device includes a user action of registering the IoT device using at least one of: a bar code, a QR code scan, an optical indication, or a manual entry. The registration step results in the public unique device identifier being associated with a gateway ID corresponding to the gateway address of the IoT device, such as the public IP address of the gateway.

A local authentication server is operative as a standalone server accessible to the IoT devices, or is incorporated into a gateway router having a connection to the internet. The IoT device issues an association request to the local authentication server, which forwards the association request to the association server using the IoT public device identifier. The Association server receives the optionally encrypted registration request, and responds with a registration acknowledgement which includes the private device identifier of the IoT device extracted from the association server device database using the public device identifier of the registration request. The authentication server forwards the encrypted registration acknowledgement which includes the private device identifier to the requesting IoT device. The requesting IoT device compares the received private device identifier with its own private device identifier, and if they match, the IoT device begins advertising for association so that it may complete the association with the WLAN.

Association of an IoT device with an unauthorized network is thereby prevented by the requirement that the IoT device receive an encrypted private device identifier (which prevents cloning of the Mac Address by an unauthorized party), and prevents the association to an unregistered network by comparing the association request with the registered gateway in the association server gateway database.

DETAILED DESCRIPTION OF THE INVENTION

Figure 1:
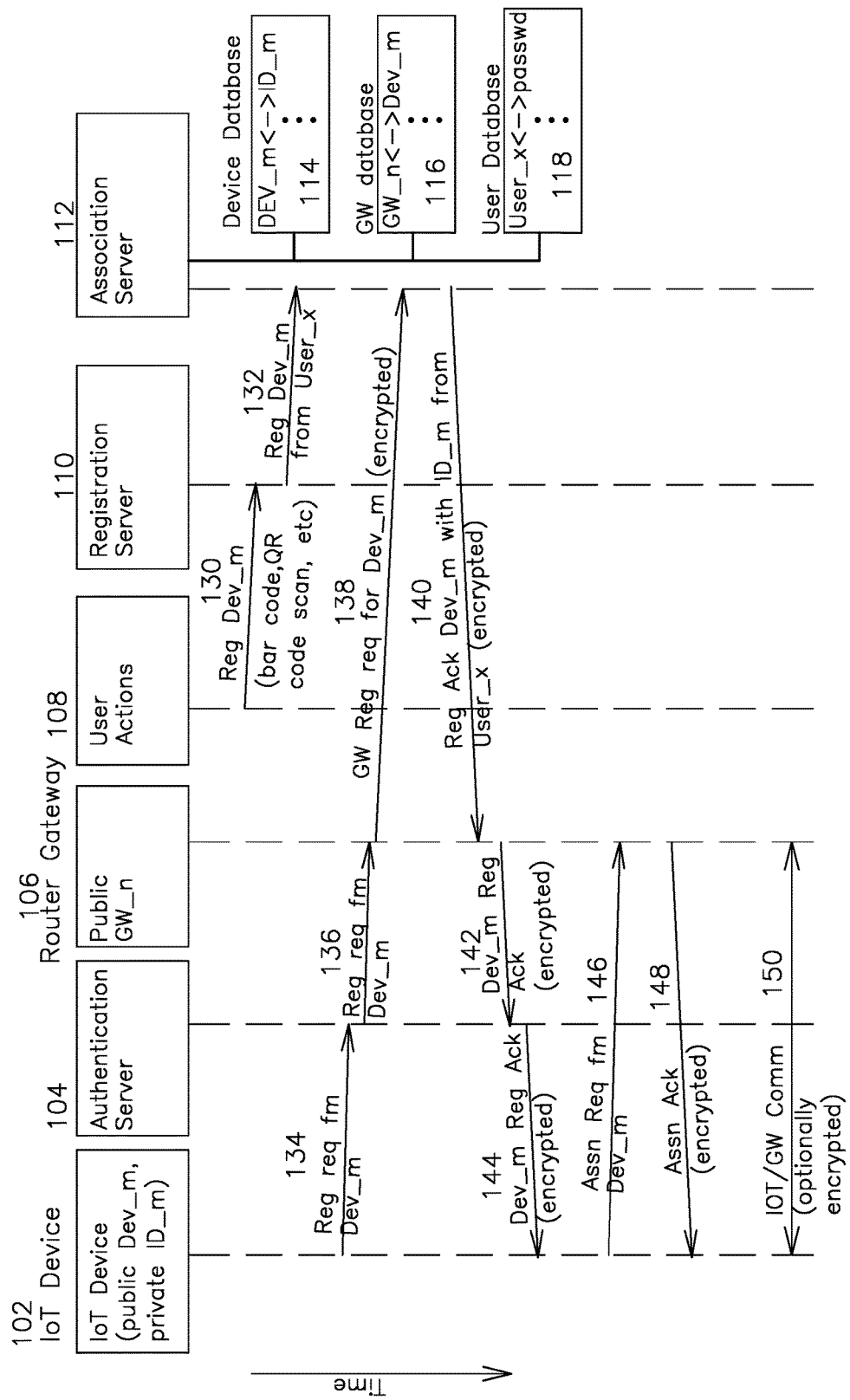
FIG. 1 shows a block diagram and registration sequence for a physically uncloneable IOT registration event using a separate authentication server.

FIG. 1 shows a block diagram of the servers and devices of the registration method, as well as a time diagram for progression of the registration sequence. An Internet of Things (IoT) device 102 internally maintains a public device identifier and a private device identifier. The public device identifier is available through an electronic interface, wireless interface, or is in printed form on the outside of the device, whereas the private device identifier is secret. The IoT device is typically a wireless device, with a wireless local area network (WLAN) interface, a Bluetooth wireless interface, or a ZigBee wireless interface. The IoT device 102 typically has an ISO layer 2 address such as a MAC address for WLAN, and a layer 3 address such as an IP address for connectivity to internet hosts and other devices having layer 3 addresses. Authentication server 104 is responsible for the centralized handling of IoT device registration requests from all of the IoT devices on the network access point (such as gateway router 106), for which a particular single IoT device 102 is shown. The IoT devices may communicate in a wireless infrastructure using one or more gateway routers 106, which provide network address translation (NAT) and firewall functionality, for example providing that TCP connections may only originate inside the local area network. The gateway router 106 typically has one or more interfaces which provide access to the internet and other publicly available host computers. A registration server 110 is used for maintaining entries into the databases of the association server 112.

One of the association server 112 databases is a device database 114 which contains key:value entries for the binding between the IoT public device address and the IoT private (secret) device address for each IoT device. Another association server databases are the gateway database 116, which optionally registers one or more gateway server identifiers to each IoT public device identifier. An optional user database 118 has bindings between a username and password, for access to the device database or gateway database, and the user database 118 includes entries which indicate which devices (such as by using the IoT public device identifier) is associated with a particular user.

The IoT public device identifier, IoT private device identifier, and gateway identifier are all unique identifiers, such that a lookup request by private device identifier, public device identifier, or gateway identifier are each referencing unique identifiers which may be operative as unique keys of each database. As the layer 2 network layer specifies that a unique address be assigned to each device, the MAC address may be a suitable use for the public device identifier and gateway identifier. The private device identifier is known to the manufacturer when burned into the IoT device and a copy is maintained in the device database 114, but is otherwise kept secret in the present system. The public device identifier and secret private device identifier may be any form of universally unique identifier (UUID) known in the prior art.

The device database 114 is initialized with key:value pairs of IoT public device identifier and accompanying IoT private device identifier. As the IoT private device identifier is secret, the device database may be initialized and updated by a manufacturer of the IoT devices with knowledge of the public and private identifiers of each manufactured IoT device. In one example of the invention, the key is the IoT public device identifier such as MAC address, and the value is the IoT private device identifier of each key:value pair.

The registration sequence for an IoT device starts with the IoT device sending a registration request 134, which identifies the requester using the IoT public device ID. The authentication server 104 receives the registration request 134 from the IoT device 102, and forwards the registration request 136 to the gateway router 106, which performs network address translation (NAT), optionally domain name service (DNS) address resolution, and forwards the registration request 138 to the association server 112. The association server may handle the request several different ways. At the most basic level, the association server 112 looks up the private device identifier from the public device identifier from the request 138 using device database 114, and sends a registration acknowledgement 140 which contains the IoT private device identifier associated with the IoT public device identifier of the request 138, where the acknowledgement 140 is encrypted to maintain the secrecy of the IoT private device identifier. The gateway router 106 routes the registration acknowledgement 142 to authentication server 104, which forwards the registration acknowledgement 144 back to the requesting device 102. The requesting IoT device 102 decrypts the registration acknowledgement, optionally extracts the public device identifier and confirms that it matches its own public identifier of the original request, and then extracts the private device identifier which was originally derived from the device database 114. If the private device identifier of the association acknowledgement 144 matches the IoT private device identifier stored within the IoT device 102, then the IoT device is authorized to send association request advertisements 146, which the router gateway 106 acknowledges 148, after which the access point router 106 and IoT device 102 communicate 150 in a prior art manner, either using encrypted or unencrypted communications as part of a wireless local area network infrastructure.

The authentication server 104 may cache subsequent device registration requests 134 after receiving the first registration acknowledgement 140 for a particular device. In this manner, the subsequent registration acknowledgements may be provided locally from authentication server 104. Alternatively, the association server 112 may respond to requests from the authentication server 104 such that the authentication server 104 keeps an encrypted local copy of the device database which is under the authority of the association server 112, such as by requiring the encrypted local copy of the device database to be in periodic communication with the association server 112 and cancelling the received registration acknowledgements so they are not available for future use as a way of bypassing the request routing to the association server 112.

The association server 112 may provide different levels of authentication upon receipt of a registration request 138. In one example of the invention, the association server receiving the registration request 138 may also utilize a gateway database 116 to verify that the gateway 106 making the request 138 is authorized to do so for the particular IoT public device identifier. This may be done by having each subject IoT public device identifier registered to a particular gateway identifier, such as by using the public IP address or public MAC address for the internet port of the gateway. If the public IP address of the gateway is dynamic or is otherwise subject to change, the MAC address associated with the public IP interface, or other unique identifier of the gateway router may be used.

Figure 2:
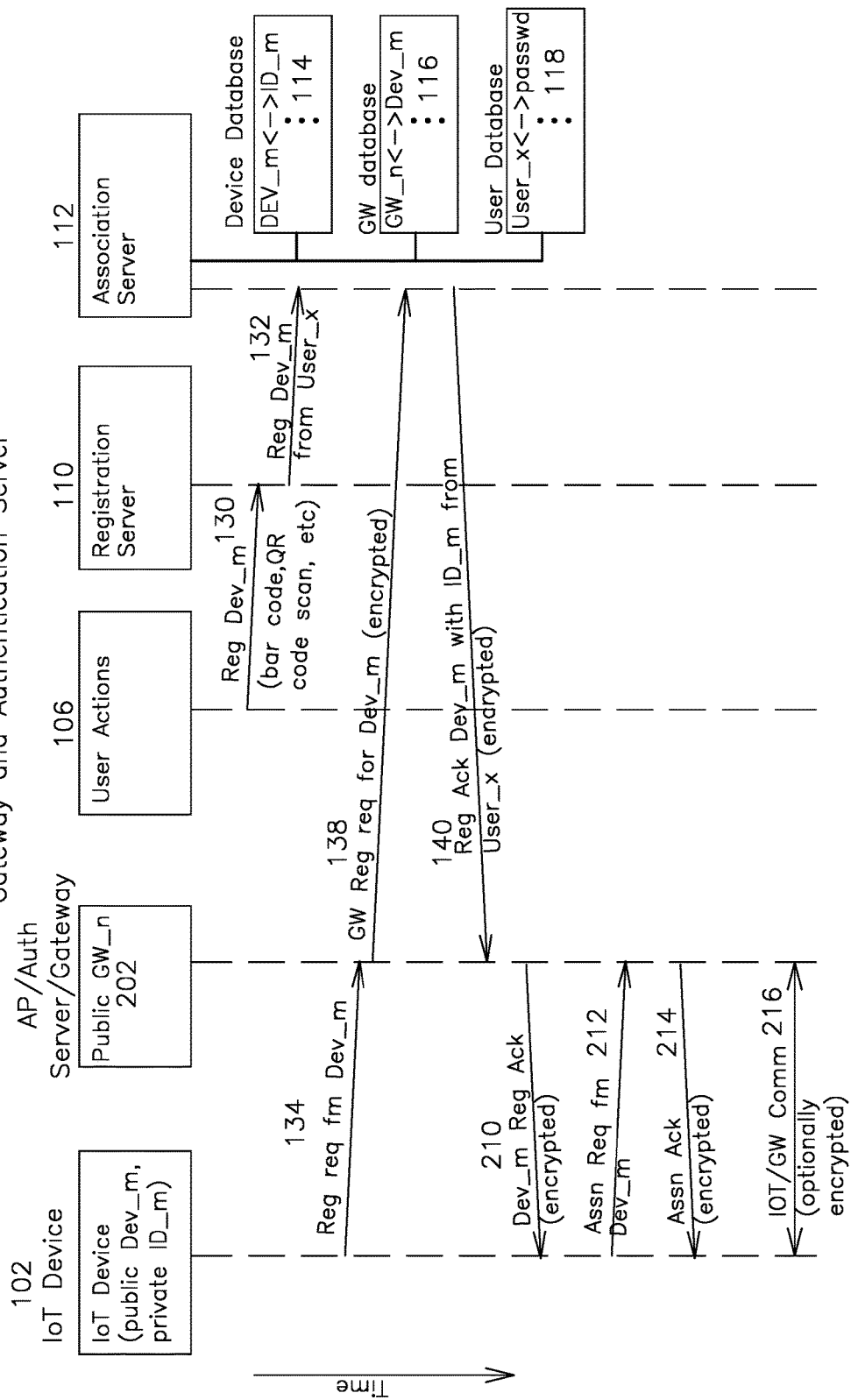
FIG. 2 shows a block diagram and registration sequence for a physically uncloneable IOT registration event using a gateway router which includes an authentication server.

FIG. 2 shows an example embodiment of a physically uncloneable registration server where server 202 is referenced according to the functions it is performing, including wireless access point (WAP) functions to the IoT device 102, gateway and NAT functions to the association server 112, and also authentication server functions such as were performed by authentication server 106 of FIG. 1. In this example, the registration request 134 forwarded as 138 is sent to association server 112 as before, which results in a registration acknowledgement 140 sent to server 202. Server 202 forwards the registration acknowledgement 210 to IoT device 102, and if the IoT device 102 determines that the private device identifier from device database 114 matches its own private identifier, the IoT device 102 issues an association request 212, which is acknowledged 214 by AP 202 and infrastructure communications 216 are thereafter initiated and continue for the duration of the association between IoT device 102 and wireless access point gateway 202.

Figure 3:
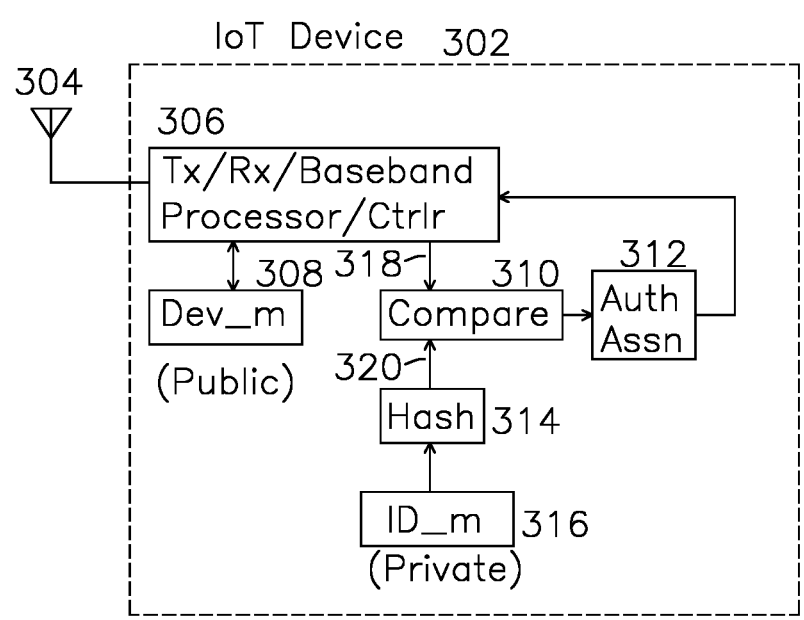
FIG. 3 shows a block diagram for an example IoT device.

FIG. 3 shows an example IoT device 302 which includes an antenna 304 for communication with an AP (not shown). A controller 306 which includes a transmitter, receiver, and baseband processor is coupled to the antenna and is operative to execute the protocols shown in FIGS. 1 and 2. The controller 306 is coupled to a public identifier Dev_m 308, which is accessible directly to the controller 306, and may include information printed on the IoT device 302, or is transmitted by the IoT device (such as the registration request 134 of FIGS. 1 and 2). The private identifier ID_m 316 is not publicly accessible. In one example of the invention shown in FIG. 3, the private ID_m 316 may be hashed 314 using a Secure Hash Algorithm (SHA) such as the SHA-2 as described by the United States National Security Agency (NSA). An incoming registration acknowledgement such as 140 of FIG. 1 or 2 which includes a secure ID_m as a hash may be compared 318 to generate an authorization for association 312 to the controller 306. Alternatively, the ID_m 316 may be directly coupled to the controller 306, which decrypts an incoming registration acknowledgement 140 and the decrypted received ID_m from message 140 may be directly compared to the ID_m 316 which is unique to the IoT device 302 and not directly accessible from an external query.

We claim:

1. An authentication system configured to register an Internet of Things (IoT) device to a network, the authentication system comprising:

at least one computer processor;

the IoT device having a public device identifier, a private device identifier, and an association request generator which is enabled after receiving an authentication containing a private device identifier from an authentication server which matches the IoT device private device identifier;

an authentication server configured to receive a registration request from the IoT device, the authentication server forwarding the registration request to an association server, the authentication server, upon receipt of a registration acknowledgement for the IoT device, forwarding the registration acknowledgement to the IoT device;

the association server having a device database having a plurality of IoT public device identifiers, each of the IoT public device identifiers associated with a corresponding IoT private device identifier, the association server coupled to a gateway database with an association between a gateway identifier and one or more IoT public device identifiers, the association server also coupled to a user database with an association between a username, a password, and a gateway identifier;

the IoT device sending a registration request containing the public device identifier and the private device identifier of the IoT device to the authentication server, the authentication server forwarding the registration request to the association server, the association server responding to the registration request with an encrypted registration acknowledgement containing at least the public device identifier of the registration request and, if present in the device database, the associated private device identifier, the authentication server forwarding the encrypted registration acknowledgement to the IoT device making the registration request, the IoT device comparing the private device identifier in the registration acknowledgement with its own IoT private device identifier, and if the private device identifier of the registration acknowledgement and the private device identifier of the IoT device match, the IoT device making a Wireless Local Area Network (WLAN) association request.

2. The authentication system of claim 1 where the IoT public device identifier is a media access controller (MAC) address.

3. The authentication system of claim 1 where the gateway identifier is a gateway public IP address or a gateway MAC address.

4. The authentication system of claim 1 where the IoT device public identifier is at least one of: a visible MAC address, a QR code, or a bar code.

5. The authentication system of claim 1 where at least one of the forwarded registration request, or the private device identifier is encrypted.

6. A method for registration of an Internet of Things (IoT) device having a public device identifier and a private device identifier, the method comprising:

the IoT device sending a registration request containing the public device identifier to an authentication server;

the authentication server forwarding the registration request to an association server, the association server having access to a device database of unique associations between public device identifiers and private device identifiers for a plurality of IoT devices, the association server examining the device database for an entry matching the public device identifier of the registration request, thereafter responding to the registration request containing the public device identifier with a registration acknowledgement directed to the IoT device making the registration request, the registration acknowledgement containing the public device identifier and a private device identifier in encrypted form;

the IoT device decrypting the registration acknowledgement and extracting the public device identifier and also the private device identifier, the IoT device comparing the extracted private device identifier with its internal private device identifier to form a match result, the IoT device transmitting an association request if the match result is true.

7. The registration method of claim 6 where the IoT device sending and the IoT device receiving is using at least one of: a WLAN protocol, a Bluetooth protocol, or a ZigBee protocol.

8. The registration method of claim 7 where the WLAN protocol is an 802.11 protocol.

9. The registration method of claim 6 where the IoT public device identifier is a MAC address.

10. The registration method of claim 6 where the registration request received by the association server also includes a gateway ID from a gateway device forwarding the registration request, the association server comparing the gateway ID and the IoT public device identifier of the registration request with a gateway identifier associated with a corresponding IoT device public device identifier in a gateway database, and if the IoT public device identifier of the IoT registration request is associated with the gateway identifier in the gateway database, responding with an encrypted registration acknowledgement containing the IoT public device identifier and associated IoT private device identifier from the association server device database.

11. The registration method of claim 6 where the encrypted form of the registration acknowledgement is a hash of the private identifier.

12. The registration method of claim 6 where the IoT device public identifier is at least one of: a visible MAC address, a QR code, or a bar code.

13. The registration method of claim 6 where the registration request is encrypted.

* * * * *